Feb. 7, 1939. T. P. CHASE 2,146,010
BRAKE
Filed Feb. 1, 1937 2 Sheets-Sheet 1

Inventor
Theron P. Chase
By Blackmore, Spencer & Flint
Attorneys

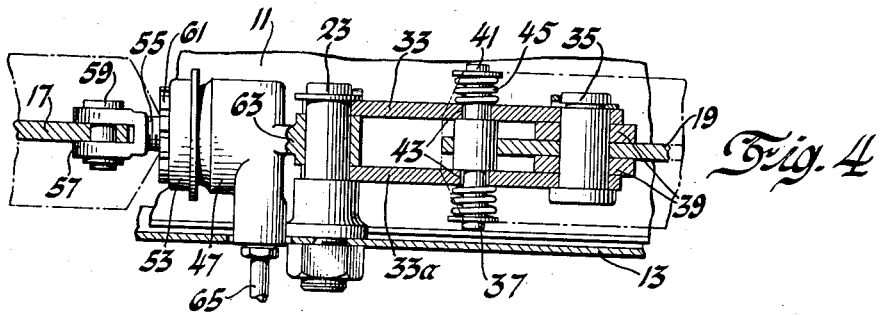
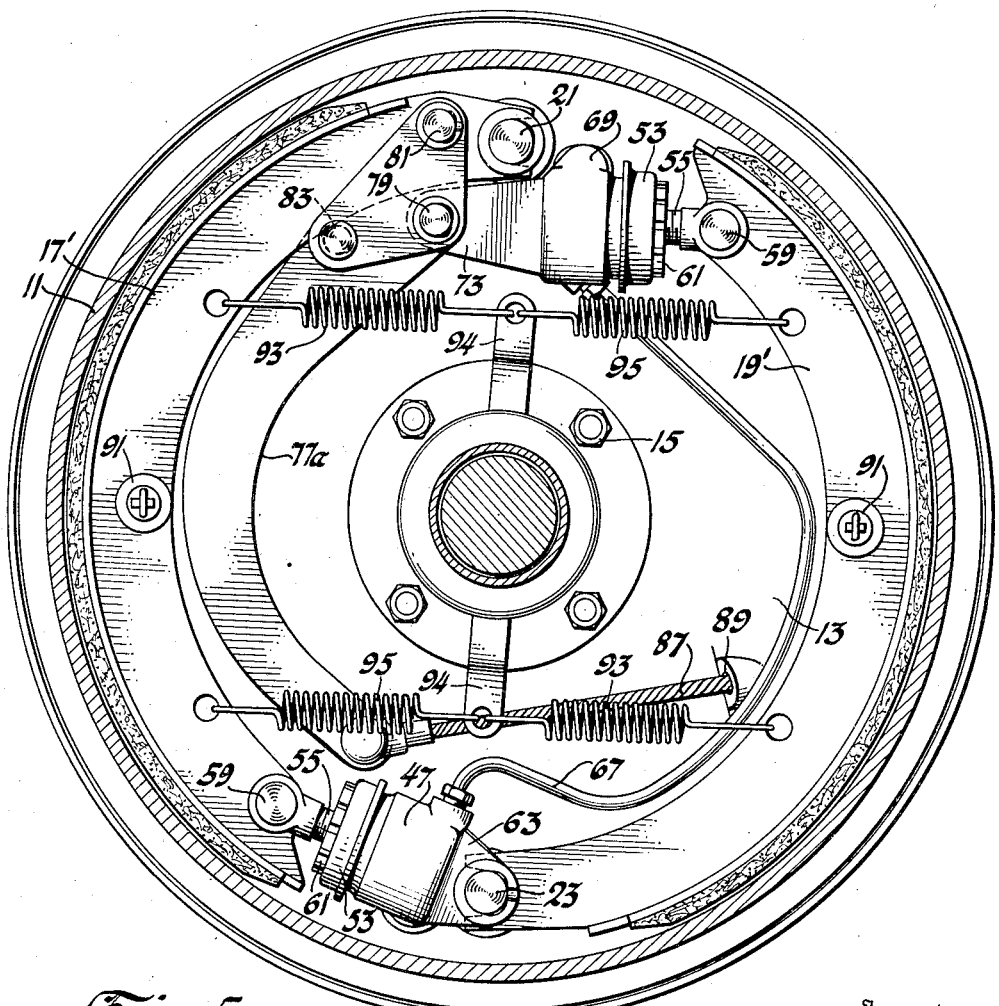

Patented Feb. 7, 1939

2,146,010

UNITED STATES PATENT OFFICE 2,146,010

BRAKE

Theron P. Chase, Detroit, Mich., assignor to General Motors Corporation, Detroit, Mich., a corporation of Delaware Application February 1, 1937, Serial No. 123,391

5 Claims. (Cl. 188—152)

This invention relates to brakes and has been designed more particularly for use on vehicles.

The novel brake combines a hydraulic brake applying mechanism and an independent but associated emergency mechanical applying means, both the mechanical and the hydraulic means operating upon a single pair of shoes. The arrangement is such that equal pressures may be applied upon the two shoes resulting in a balanced reaction between the shoes and drum. It is also arranged such that the torque transmitted by the two anchor pins is equally divided, thereby minimizing drum distortion and avoiding displacement of the drum with reference to the brake assembly. The design also utilizes stronger springs at the anchored end of the shoes than at the toe end to insure the holding of the trailing end of the shoes firmly against their anchorage.

The invention, insofar as it relates to the applying means, involves mechanism whereby, when the shoes are applied by the hydraulic mechanism, the applied forces are supplemented by self-actuating forces upon both shoes in the case of forward vehicle travel. In the case of rearward travel the hydraulic applying mechanism is supplemented by the self-actuating force of drum rotation in the case of one shoe only. When the shoes are applied by the mechanical spreading means, one shoe only is subject to the combined forces, the particular one being dependent upon the direction of drum rotation and vehicle travel.

An important feature of the invention is the simple mechanism by which the structure for the emergency mechanical operation is associated with and operates through parts of the hydraulic applying means.

Other objects and advantages will be understood from the following description.

In the drawings,

Fig. 4 is a section on line 4—4 of Fig. 1.

Fig. 5 is a view similar to Fig. 1 but showing a modified form.

Figure 1:
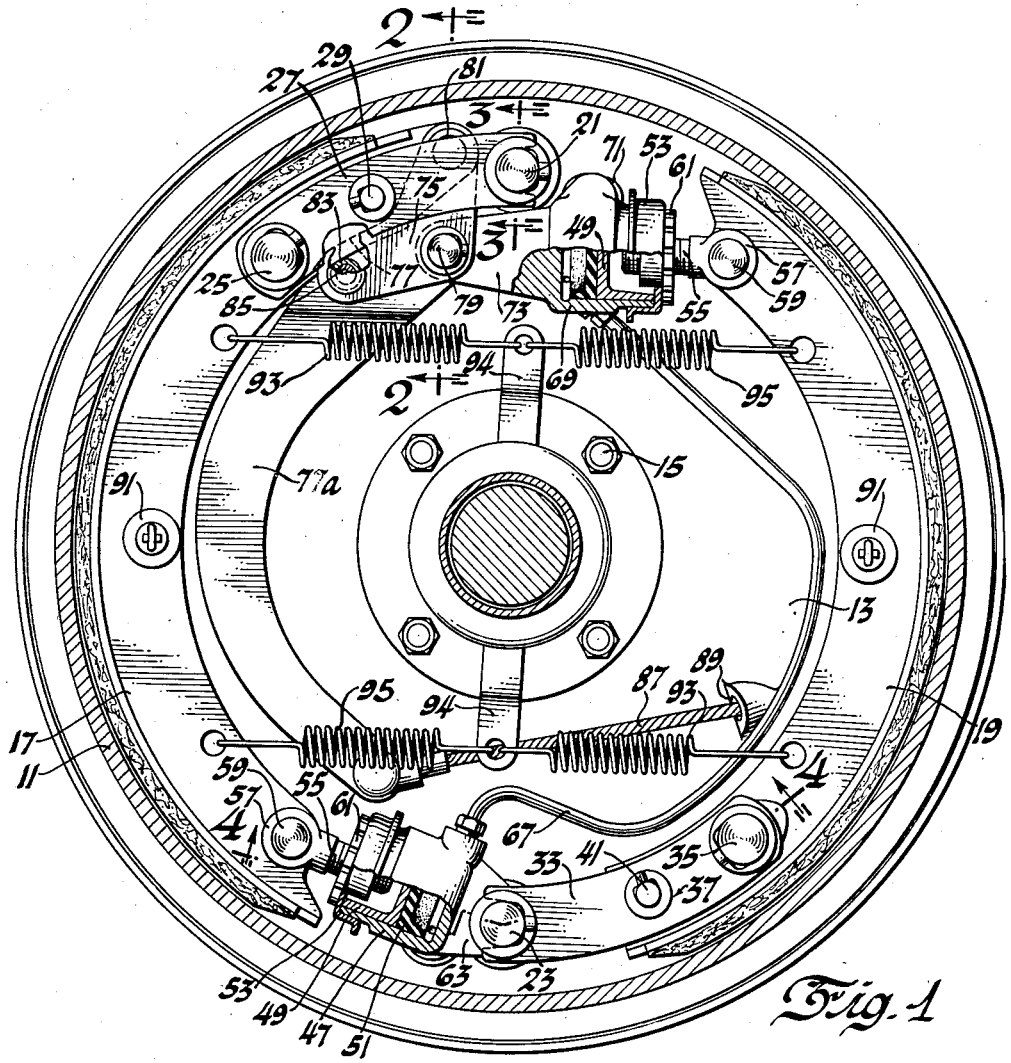
Fig. 1 is a vertical section through a brake drum showing the shoes and operating mechanism for the most part in elevation.
Figure 2:
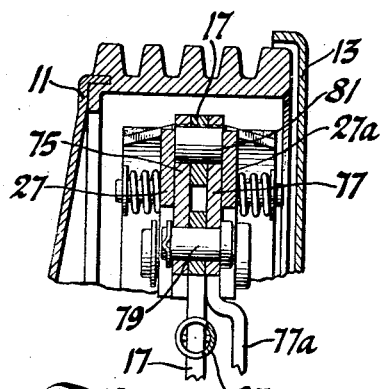
Fig. 2 is a section on line 2—2 of Fig. 1.
Figure 3:
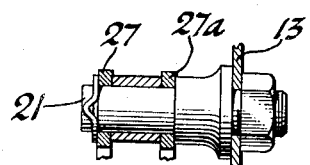
Fig. 3 is a section on line 3—3 of Fig. 1.

Referring by reference characters to the drawings, numeral 11 is used to designate a conventional brake drum. This may be considered to be the drum used with a rear wheel of a vehicle for the reason that it is more commonly the rear wheels which have drums, the shoes within which are applied in service by hydraulic means and which are also adapted to be applied by a mechanical hook-up associated with an emergency lever.

Numeral 13 is used to designate the conventional cover plate or backing plate. This plate is as usual secured to an axle housing flange as at 15. Within the brake drum are shoes 17 and 19. Secured to the cover plate are anchor pins 21 and 23 located diametrically opposite each other. Shoe 17 is mounted to anchor on pin 21 through the instrumentality of articulating links 27 and 27a. These links are pivoted to the shoe 17 on opposite sides of its web by a pin 25. Limited movement of the links about the pin is provided by mechanism marked 29 more fully described below. The ends of the links are recessed to engage the pin 21 as clearly illustrated by Fig. 1.

In a similar way links 33 and 33a are pivoted to shoe 19 on pin 35 and these links anchor on pin 23. Limited movement is provided at 37. Fig. 4 shows in detail the relation of shoe 19, links 33, 33a and anchor pin 23. It will be seen that surrounding the pin 35 and between the web of shoe 19 and the ends of the links 33, 33a are spacing sleeves 39. The construction marked 37 on Fig. 1 and illustrated more specifically in Fig. 4 comprises a pin 41 carried by the shoe web and extending through enlarged openings 43 in the links 33 and 33a, the openings being dimensioned to afford the limited swinging of the links about the pivot pin 35. Springs 45 surround the pin 41 and by their pressure on the links resist the rotation of the links. Substantially the same construction is employed in the case of shoe 17 and its links 27, 27a.

Between one pair of adjacent ends of shoes 17 and 19 (the ends identified by anchor pin 23) is a hydraulic cylinder 47 within which reciprocates a piston 49 having a sealing cup 51. A cap 53 surrounds the open end of the cylinder and may engage the wall of said open end. This cap is also engaged by the end wall of the piston as is shown in Fig. 1. A screw 55 terminates in an eye 57 pivoted to shoe 17 by pin 59. The screw freely enters the hollow piston but is threaded to the nut 61. The nut 61 carries a peripherally notched part whereby it may be rotated and the screw reciprocated to adjust the clearance between the shoe and the drum. The cylinder 47 has at its closed end a projection 63 which is pivoted on the anchor pin 23 between the links 33 and 33a as shown by Fig. 4. Hydraulic medium from a suitable master cylinder, not illustrated, is transmitted by means of a pipe 65 to cylinder 47 between its closed end and the piston. From cylinder 47 a pipe 67 carries the fluid to a second cylinder 69 located between the other pair of adjacent ends of the shoes. Any convenient air bleed may be provided in boss 71 in the cylinder 69 at the uppermost part of the cylinder.

Cylinder 69 is provided with a piston 49 like that of cylinder 47 and the connections of this piston with the adjacent end of shoe 19 are the same as the connections between the shoe 17 and the piston 49 of cylinder 47. The projection 73 of cylinder 69 is longer than its counterpart 63 of cylinder 47 and this projection 73 is not anchored on anchor pin 21 as was the case of the projection 63. Instead of being so anchored, it is pivoted to and between spaced arms 75 and 77 by a pin 79, the arms extending between the links 27 and 27a. The arms 75 and 77 lie on opposite sides of the web of the shoe and are pivoted thereto by a pin 81. In Fig. 1 link 27 is broken away to show a roller 83 carried on a pin 85 which is supported by arms 75 and 77. This roller is adapted to engage the edge of the web of the shoe 17. One of the arms is extended to form a lever 77a. The end of the lever is connected by a cable 87 passing through an opening 89 in the cover 13 and this cable is adapted to be attached to an emergency lever hook-up of any preferred kind.

Numeral 91 is used to designate any convenient form of shoe holding device to retain the shoe axially toward or against the cover plate. At 93 and 95 are springs fixedly anchored as at 94 at their adjacent ends and connected to the shoes at their outer ends. It will be noted that springs 93 pull upon the shoes at their ends adjacent the anchor pins. Because of the location of the points of attachment, these springs 93 pull upon the shoes adjacent their pivoted ends more forcibly than the springs 95 pull upon the other ends. By this arrangement the engagement of the shoes with their anchor pins is insured. It will be noted that in the region adjacent anchor 21, spring 93 pulls shoe 17 so that it anchors on anchor 21, and that spring 95 pulls shoe 19 so that projection 73 of cylinder 69 moves and causes roller 83 to contact the edge of shoe 17.

The operation is as follows: When fluid is forced into cylinder 47, since the cylinder is anchored on pin 23, the movement is confined to the piston which pushes the shoe 17 against the drum, the shoe anchoring by means of its links 27, 27a, upon the pin 21 when the drum is turning clockwise, the direction intended to correspond with forward vehicle travel. The fluid pressure transmitted by pipe 67 to cylinder 69 cannot move this cylinder 69 to any appreciable extent because its position is fixed, owing to the contact of the roller 83 with the web of the shoe 17, that shoe being now held to its anchorage as explained above. The whole movement, therefore, is confined to the piston, which movement applies shoe 19. Owing to the direction of drum rotation, this shoe is also self-actuating. It will therefore be seen that for forward vehicle travel the hydraulic forces in the case of each shoe supplement the force of self-actuation and the brake action is highly effective in resisting drum rotation. In checking reverse rotation, the self-actuating force in the case of shoe 19, is opposed by the hydraulic force applied by cylinder 69. Shoe 17, actuated both by self-actuating force and by hydraulic means, (cylinder 69) anchors on pin 23 through the engagement of the cap 53 with the end of cylinder 47. In this case, therefore, shoe 17 is more effective than shoe 19 since both hydraulic and self-actuating forces are effective on shoe 17 to rotate it against the drum. For emergency operation the lever 77a is rocked in a counter-clockwise direction (see Fig. 1). Roller 83 ceases to contact shoe 17 and a conventional two-shoe operation is effected by means of a pivoted connection at 81 with shoe 17 and a link connection through the hydraulic cylinder 69 with shoe 19, the pin 21 being the anchorage pin in this case for both shoes.

It will be seen that by these simple arrangements the several advantages of effective brake operation with balanced pressures as set forth above are accomplished in a brake organization whereby either hydraulic means or emergency mechanical applying means may be used.

Fig. 5 shows substantially the same arrangement of shoes and applying means, the difference being that the articulated linkage between the shoes and their anchor pins are omitted. Shoe 17' directly engages its anchor 21 and shoe 19' directly engages its anchor pin 23. Similar reference characters are used to illustrate the corresponding parts. The operation is the same as before with the exception that the better conformity of the shoes to the drum afforded by the articulating linkage is sacrificed.

I claim:

1. In a brake, opposed shoes, an operating lever, pivot means between said lever and one end of a first shoe, said lever having contact means spaced from its shoe pivot and adapted to engage said first shoe, a reciprocating link connected to said lever and to said second shoe adjacent the end thereof, said link including as a part thereof fluid pressure means, an anchor pin for said first shoe between the adjacent shoe ends, a second anchor pin between the opposite pairs of adjacent ends of said shoes, the second shoe adapted to engage said second anchor, and a second fluid pressure means secured to said second anchor and operable on the first shoe, said fluid pressure means and reciprocable link connection each having engaging parts whereby they act as rigid links.

2. In a brake drum, oppositely disposed first and second shoes, anchor means between each pair of adjacent ends, the first shoe adapted to engage one anchor means and the second means adapted to engage the second anchor means, hydraulic shoe applying means between each pair of adjacent ends and comprising parts mounted for relative axial movement, one of said last-named parts being attached to each shoe at the end remote from the shoe anchorage, the other part of one of said hydraulic applying means attached to the adjacent anchor means, means pivoted to the other part of the other hydraulic applying means and to the first shoe and having a member adapted to contact said first shoe.

3. The invention defined by claim 2, said last-named means including a rigid lever extension whereby when said means and extension is rocked about its pivotal connection with the first shoe the shoes may be mechanically applied, the hydraulic applying means acting as thrust links.

4. In a brake, opposed shoes having a pair of adjacent ends, an operating lever, pivot means between said lever and a first of said shoes adjacent its said end, said lever having means spaced from said pivot means adapted to contact said first shoe, an axially reciprocable link connected to said lever and to the second of said shoes adjacent its said end, said link including relatively reciprocable parts, means to force fluid under pressure between said parts, an anchor adjacent said ends and adapted to be engaged by the first of said shoes and yielding means to move said first shoe against its anchor and to move said second shoe and link so that said contact means contacts said first shoe.

5. The invention defined by claim 4, said yielding means comprising first and second springs, the first spring to effect the contact of the first shoe with its anchor and the second spring to effect the contact of the contact means with the first shoe.

THERON P. CHASE.